United States Patent [19]

Henoch et al.

[11] 4,358,765

[45] Nov. 9, 1982

[54] APPARATUS FOR PRODUCING A SINGLE SIDE BAND

[75] Inventors: Bengt Henoch, Hägersten; Eilert Berglind, Bandhagen, both of Sweden

[73] Assignee: Stiftelsen Institutet for Mikrovagsteknik vid Tekniska Hogskolan i Stockholm, Stockholm, Sweden

[21] Appl. No.: 67,124

[22] Filed: Aug. 16, 1979

[30] Foreign Application Priority Data

Aug. 25, 1978 [SE] Sweden .................................. 7809017

[51] Int. Cl.³ .............................................. G01S 13/78
[52] U.S. Cl. .............................. 343/6.5 SS; 343/18 D; 343/6.8 R
[58] Field of Search ........................ 343/6.5 SS, 18 D

[56] References Cited

U.S. PATENT DOCUMENTS

| 2,193,102 | 3/1940 | Koch . |
| 2,602,160 | 7/1952 | Wilkins ........................ 343/6.5 R |
| 2,774,060 | 12/1956 | Thompson . |
| 3,025,516 | 3/1962 | Bickler ......................... 343/6.5 R |
| 3,206,746 | 9/1965 | Beyersdorf et al. ........... 343/6.5 SS |
| 3,480,951 | 11/1969 | Freedman ...................... 343/6.8 |
| 3,480,952 | 11/1969 | Freedman ...................... 343/6.8 |
| 3,500,399 | 3/1970 | Norris ........................... 332/16 R |
| 3,631,484 | 12/1971 | Augenblick .................... 343/6.5 R |
| 3,699,479 | 10/1972 | Thompson et al. ............. 332/16 R |
| 3,718,899 | 2/1973 | Rollins ........................... 340/23 |
| 3,798,641 | 3/1974 | Preti .............................. 343/6.5 SS |
| 3,839,717 | 10/1974 | Paul .............................. 343/6.5 LC |
| 3,859,624 | 1/1975 | Kriofsky et al. ............... 343/6.5 R |
| 3,914,762 | 10/1975 | Klensch ......................... 343/6.5 SS |
| 3,984,835 | 10/1976 | Kaplan et al. ................. 343/6.5 SS |
| 4,019,181 | 4/1977 | Olsson et al. .................. 343/6.5 SS |
| 4,114,151 | 9/1978 | Denne et al. .................. 343/6.5 SS X |

FOREIGN PATENT DOCUMENTS

| 819566 | 9/1951 | Fed. Rep. of Germany . |
| 969289 | 5/1958 | Fed. Rep. of Germany . |
| 1295424 | 1/1970 | Fed. Rep. of Germany . |
| 1566716 | 12/1973 | Fed. Rep. of Germany . |
| 346388 | of 0000 | Switzerland . |
| 380220 | 11/1975 | Switzerland . |
| 776259 | 6/1957 | United Kingdom . |
| 776797 | 6/1957 | United Kingdom . |
| 987868 | 3/1965 | United Kingdom . |
| 1130050 | 10/1968 | United Kingdom . |
| 1168509 | 10/1969 | United Kingdom . |
| 1187130 | 4/1970 | United Kingdom . |

OTHER PUBLICATIONS

IEEE Transactions, Henoch et al., vol. MTTT-19, No. 1, Jan. 1971.
Flygapnet, Osterberg, 1963.
Proceedings of IEEE, Koelle et al., pp. 1260-1261, Aug. 1975.
"Electronic Animal . . . Monitoring", Baldwin et al., 1973.
IRE Transactions, Rutz, pp. 158-161, Mar. 1961.
Reports on Research, Sep.-Oct. 1977, vol. 5, No. 2.
IRE Transactions, Harrington, pp. 165-174, May 1962.
Proceedings of IRE, Mar. 1961, pp. 634-635.
Electronic Letters, Dec. 1975, vol. 11, pp. 642-643.
"Electronic Identification . . . Monitoring", Koelle et al., 7/73 to 6/74, pp. 1-5.
RCA Review, vol. 34, 12/73, Klensch et al., pp. 566-579.
RCA Review, Sterzer, 6/74, vol. 35, pp. 167-175.
IEEE Transactions, Jaffe et al., pp. 371-378, May 1965.

*Primary Examiner*—T. H. Tubbesing
*Attorney, Agent, or Firm*—LeBlanc, Nolan, Shur & Nies

[57] ABSTRACT

An apparatus for producing a single side band at systems where a signal of a certain frequency is received, frequency-shifted and reflected. The apparatus comprises a modulator (26), which includes only one diode (44). To the diode are applied a series of different voltage levels generated in a commutator circuit (41), which voltage levels are at least three in number. A tuning circuit (45) is provided between the diode and an aerial (25). The tuning circuit (45) is adjusted to act upon the amplitude and phase variations occurring at the diode (44) at the different voltage levels applied, so that the reflection coefficients of the diode (44) and the characteristics of the tuning circuit (45) together satisfy the condition for a single side band to be formed and transmitted from the aerial (25).

8 Claims, 11 Drawing Figures

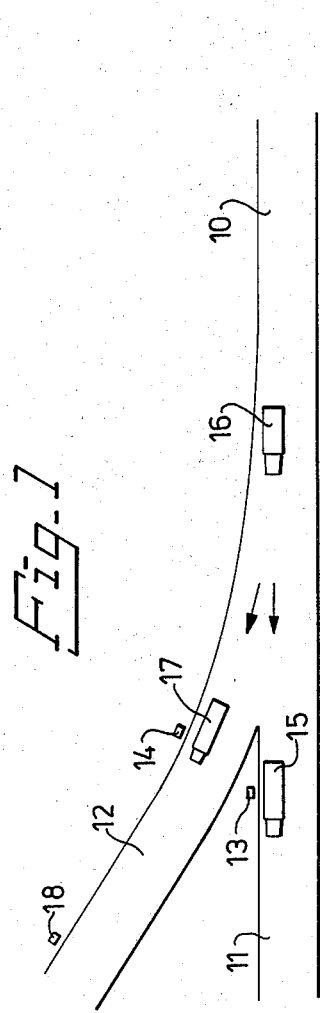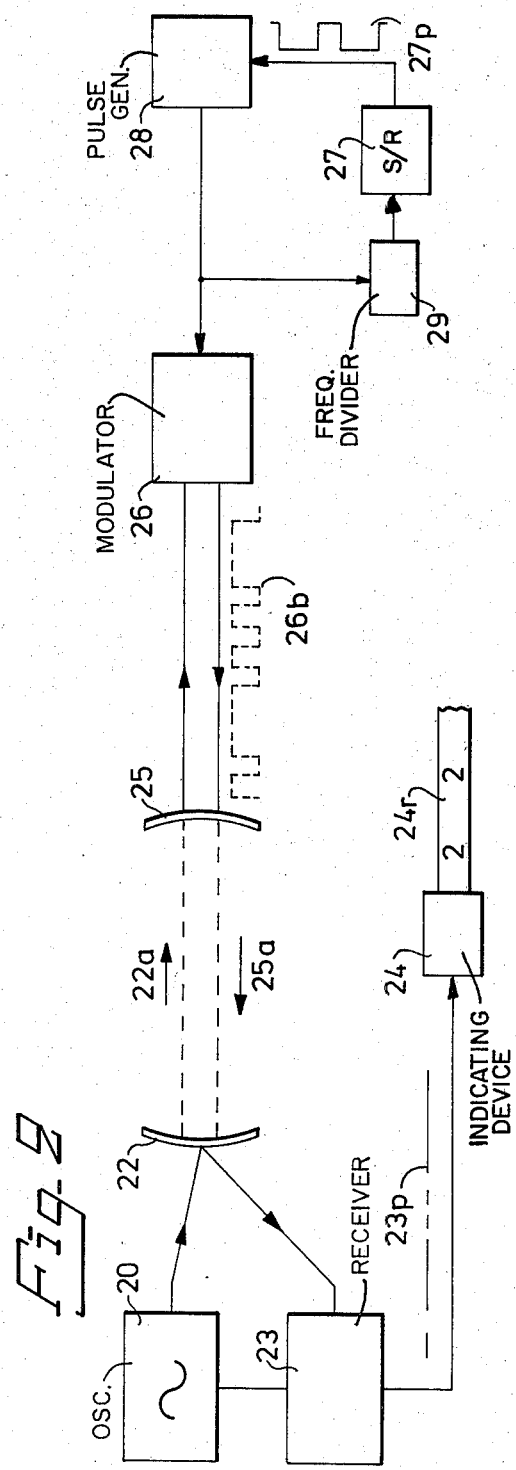

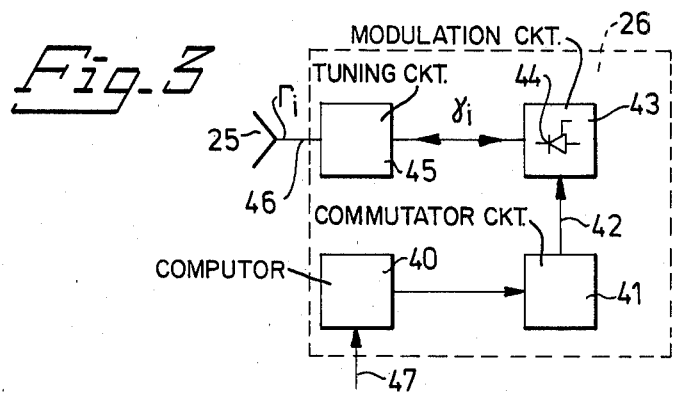
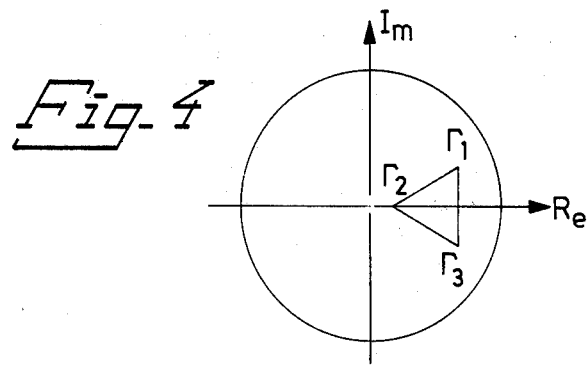
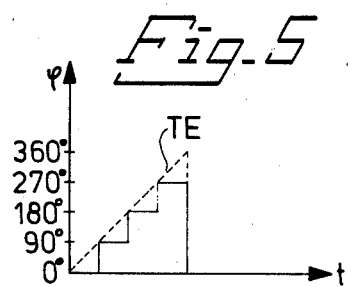
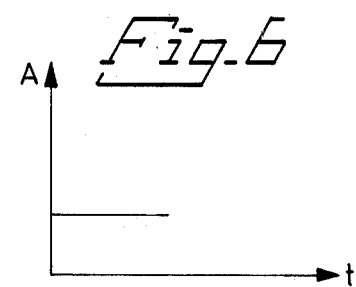
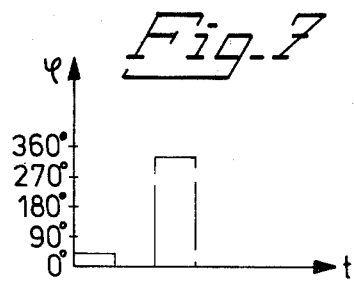
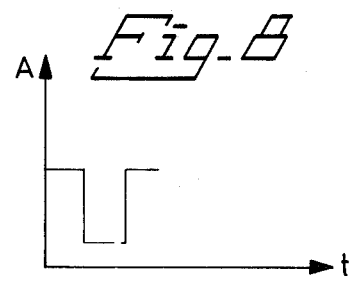

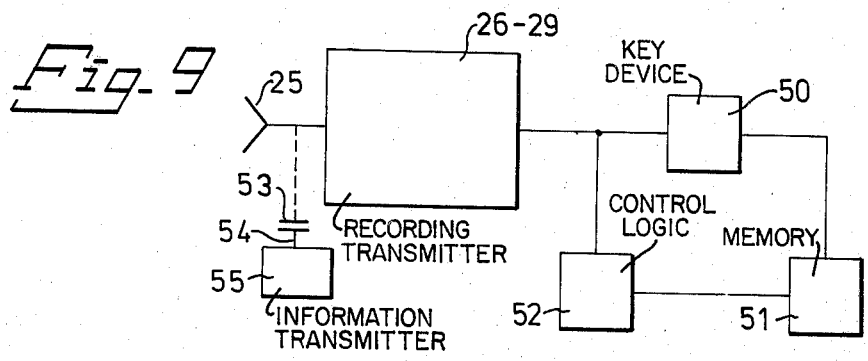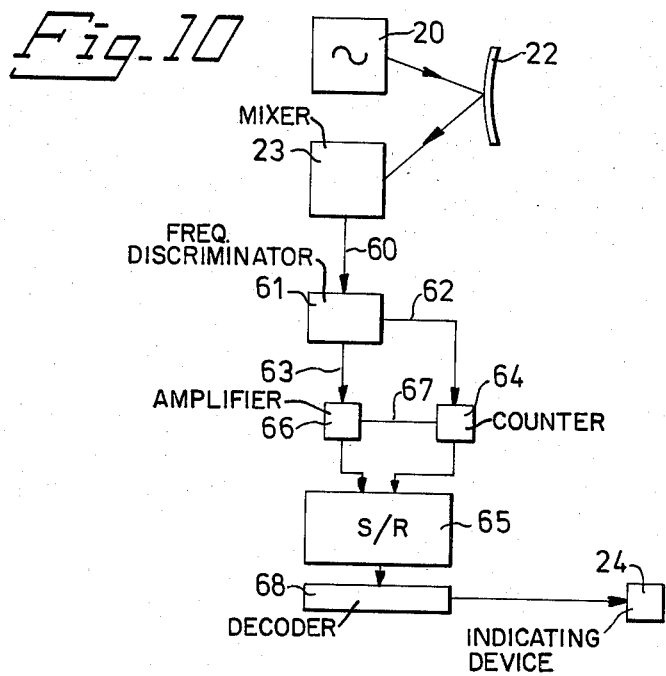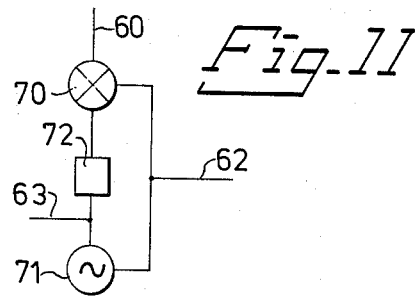

APPARATUS FOR PRODUCING A SINGLE SIDE BAND

This invention relates to an apparatus for producing a single side band, especially in connection with devices for the recording of objects and more precisely in connection with devices of the type disclosed in U.S. application Ser. No. 667,306 (Now U.S. Pat. No. 4,242,661) wherein objects (such as vehicles) are equipped with recording transmitters which are responsive to an interrogating signal for transmitting an identification of the object and/or other information to a receiver in a recorder unit at a distant station.

An apparatus according to said U.S. Pat. No. 4,242,661 is designed so that a first signal, which is transmitted from the recording unit, is received at the recording transmitter where it is frequency converted to a second signal by a code individual to the recording transmitter. Thereafter the recording transmitter retransmits the coded second signal, which is received by the recording unit where the information content in the signal is processed and utilized. In said U.S. Pat. No. 4,242,661 the aforesaid frequency converter is shown to comprise a modulator, which modulates the first signal in such a way, that a side band is formed, and the coding device is capable of providing the side band with said code individual to the recording transmitter, preferably by starting and stopping said modulator according to a pattern constituting said code.

It is essential that such apparatuses produce a digital-controlled single side band modulator permitting the use of cheap diodes. Cheap diodes, however, are dissipative.

In the aforesaid U.S. Pat. No. 4,242,661 a modulator for generating a side band is described, in which two diodes are used and voltage is applied to them by means of pulse trains. This modulator is designed so that the phase of the carrier wave is shifted in staircase form with phase shifting through 90 degrees in every step. The amplitude remains constant.

It is desired to be able to generate this staircase form and thereby to produce a single side band by means of only one diode. However, this is not possible with dissipative diodes when the amplitude is maintained constant.

In the following, the present invention is described, in which a single side band is generated by means of only one dissipative diode.

In the following descriptive part an embodiment of the invention is dealt with, where the invention is exemplified by a traffic control system. The mobile units may be provided with a recording unit, and the stationary places or stations may be provided with a device corresponding to the recording transmitter. The invention, however, can be applied also in reverse order, in which case recording transmitters are attached to mobile objects, and the recording units are located at certain selected stationary places. Examples of such an embodiment are the recording and sorting of railway cars, load containers etc. and the recording of motor cars.

The invention is described in the following, with reference to the accompanying drawings, in which FIG. 1 shows a road section, FIG. 2 is a block diagram for an apparatus according to the invention, FIG. 3 is a block diagram of a modulator incorporating the principles of this invention, FIG. 4 is a reflection diagram for the signal-modulating diode in the modulator, FIGS. 5 and 6 are diagrams showing the mode of operation of said known modulator, FIGS. 7 and 8 are diagrams showing the mode of operation of a modulator according to the present invention, FIG. 9 is a schematic block diagram of a device for remotely programming a recording transmitter, FIG. 10 shows a recording unit in greater detail, FIG. 11 shows a frequency discriminator.

In FIG. 1 a road section is shown, which is used for describing one application. 10 designates a main road, which branches into two separate roads 11, 12. At the starting points of the roads 11 and 12, a recording transmitter 13 and 14, respectively are positioned for each road and intended to cooperate with recording units which are provided on motor cars, three of which are designated at 15,16,17. Said recording transmitters are designed with a code characteristic for the unit in question, which code when a motor car passes a recording transmitter is detected by the recording unit on the motor car and recorded to be utilized later on in statistics, invoicing or the like. By receiving the codes from both the recording transmitter 14 and an additional transmitter 18, the speed of the motor car can be evaluated. After the recording unit on the motor car has received said code, information can be evaluated and either be stored in the car or be transmitted by radio from the car to a central station. The signal transmitted from the car to the central station can contain a code characteristic of the car. The central station can carry out desired evaluations and on the basis of information received be used, for example, for the control of traffic lights, for giving instructions to the car with respect to road choice, etc.

Referring to FIG. 2, the apparatus comprises a recording unit 20-24 and a recording transmitter 25-29. The recording unit comprises an oscillator 20, which is capable of transmitting a high-frequency electric signal with a fixed frequency of e.g. 10 GHz designated by $f_o$. The signal 22a is transmitted by an aerial 22 associated with the recording unit. The aerial 22 also is capable of receiving a recording signal 25a, which depends on said first signal. The recording unit further comprises a receiver 23 for receiving the recording signal, the receiver 23 being selectively tuned for the frequencies of the recording signal. These frequencies are different from the frequency of the transmitted signal. The recording unit further comprises a decoder for decoding and an indication device 24 for indicating the code in the recording signal.

The recording transmitter comprises an aerial 25 for receiving the signal transmitted from the recording unit and for transmitting the recording signal, a frequency modulation circuit 26 for supplying the recording signal, a code transmitter 27 for supplying a pulse train characteristic of the recording transmitter in question, and a clock pulse generator 28, which is capable of generating two frequencies designated $k_1$ and $k_2$, respectively, for modulating the record signal. According to a preferred embodiment, a frequency divider 29 is also provided.

The high-frequency signal 22a transmitted from the aerial 22 is received by the aerial 25 of the recording transmitter and is passed on to the frequency modulator 26, which is of such a nature, that it frequency-modulates said signal so that a single side band is formed, which has the frequency $f_o+k_2$ or $f_o+k_1$ and, respectively, $f_o-k_1$ or $f_o-k_2$. The pulse generator is so designed that at every time moment only one of the frequencies $k_1$ and $k_2$ exists. Said side band mostly is surrounded by a number of more or less suppressed side bands, which may be disregarded. The side band thus generated is retransmitted from the aerial 25 as recording signal 25a. Due to the fact that the recording signal has a frequency different from that of the signal received, it is possible to effectively separate the recording signal from irrelevant reflections from the ambient surroundings. The binary pulse train 27p emitted by the code transmitter 27 includes pulses of different lengths and/or different durations. The pulse train includes said code and is formed by a programmable memory, which contains the desired code, for example a code characteristic for the recording transmitter. The pulse train 27p, for example, may have the configuration shown in FIG. 2. This configuration is fed into the generator 28, which controls the frequency modulator 26 in the manner described below. The generator 28 is capable of being actuated by every pulse, of continuously emitting one frequency thereof as long as a pulse corresponding to one binary sign prevails and of continuously emitting its second frequency as long as a pulse corresponding to the second binary sign prevails. The generator 28 will send a signal to the frequency modulator 26 with the frequencies $k_1$ and $k_2$, respectively for example.

Only one diode, symbolized in FIG. 3, is required in the frequency modulator for forming a single side band, instead of two diodes required in conventional devices.

The signal reflected from the modulator 26, for example, will have the appearance shown at 26b in FIG. 2. It consists of two frequencies, for example $f_o+k_1$ and, respectively, $f_o+k_2$, which alternate with each other. The frequency $f_o$ is the one generated by the transmitter 20 and transmitted by the aerial 22. The higher frequency $f_o+k_1$ is the frequency of the single side band when the pulse generator generates the frequency $k_1$, and the lower frequency $f_o+k_2$ is the frequency of the single side band when the pulse generator generates the frequency $k_2$. These frequencies prevail during the duration of every pulse. The signal 26b has the same code pattern as the pulse train 27p and, thus, contains the same code.

The signal 26b is emitted by the aerial 25 and transferred to the aerial 22.

The receiver 20,23 in the recording unit is capable in a conventional manner of receiving said single side band and of decoding said code in the indication device 24.

In FIG. 3 a block diagram for a frequency modulator 26 according the present invention is shown. The numeral 40 designates a computer capable of controlling the commutator circuit 41, which is of a known design and which is capable of emitting signals with different voltage levels at its output 42. The computer 40 controls the commutator circuit so that said circuit 41 in sequence emits said voltage levels, which are three or more in number. The output 42 of the commutator circuit 41 is coupled to a modulation circuit 43, which comprises a diode 44 for modulating a carrier wave, which is received by the aerial 25. In the application of the present invention the carrier wave is transmitted by the recording unit and is reflected by the recording transmitter, which comprises said frequency modulator.

Between the aerial 25 and the modulation circuit 43 a tuning circuit 45 is provided.

The different voltage levels of the commutator circuit 41 are applied one after the other to the diode 44 in the modulation circuit, whereby the carrier wave received is reflected in the modulation circuit 43. Due to the difference in voltage levels applied to the diode, not only the phase position of the carrier wave received is rotated, but also an amplitude variation will occur. For a single side band of the first order to be formed, the relation (1) below between occurring phase rotations and amplitudes for the different voltage levels must be satisfied $$i = \sum_{1}^{N} \frac{\gamma_i}{1 - S_{22}\gamma_i} \cdot e^{j\frac{2\pi}{N} \cdot i} = 0 \text{ where } \gamma_i = \frac{V_i}{V_{in}} \quad (1)$$

where $\gamma_i$ represents the different reflection coefficients of the diode, and N is the number of voltage levels with equal duration, and $S_{22}$ is a non-dimensional factor according to below.

$\gamma_i$ is defined as $\gamma_i = V_i/V_{in}$ where $V_i$ is the voltage actually reflected by the diode, and $V_{in}$ is the signal voltage ingoing to the diode.

A tuning circuit 45 is arranged to influence phase rotations and amplitude variations occurring in the modulation circuit 43 so that a single side band is formed at the output 46 of the tuning circuit 45 to the aerial 25. The tuning circuit is a non-dissipative and reciprocal matching net.

The single side band modulator 26 is therefore digitally operated by the computer 40. The computer 40 is capable of controlling the commutator circuit 41 so that said circuit successively applies different voltage levels, which are N in number and where an entire sequence of levels have a cycle time T. The carrier wave, which has the frequency $f_o$, is reflected in the diode, and the reflected wave consists of frequency components $f_o+n:1/T$ where $n=0, \pm1, \pm2, \ldots$ By a suitably selected tuning circuit a side band $n_o$ with the amplitude 0 and a symmetrically located side band $-n_o$ with an amplitude separate from 0 are obtained. A preferred case is $n_o = -1$, to which the above relation (1) applies.

According to a preferred embodiment, the number of voltage levels is low, but also a great number of voltage levels can be used. The minimum number N of voltage levels $V_i$ is 3. It further is preferred to choose for every voltage level $V_i$ equal duration, i.e. T/N.

The said reflection coefficient $\gamma_i$ refers to the reflection coefficient prevailing between the diode 44 and the tuning circuit. $\Gamma_i$ designates the reflection coefficient prevailing at the output of the tuning circuit to the aerial 25.

The non-dimensional factor $S_{22}$ expresses the load, which the diode is required to see of tuning net and aerial for a single side band to be formed.

It is possible to draft $\Gamma_i = A \cdot e^{j\phi}$ where A is the amplitude and $\phi$ is the phase angle. For a case where $N=3$, it will appear from above relation and known relation between $\gamma_i$ and $\Gamma_i$ that the three reflection coefficients $\Gamma_1, \Gamma_2, \Gamma_3$ must define the corners in an equilateral triangle for a single side band to be formed. FIG. 4 shows by way of example a reflection diagram in the plane of complex numbers where an equilateral triangle is formed. In FIG. 4 Im designates an imaginary axis and Re a real axis.

Knowing the reflection coefficients of the diode 44, and therewith the factor $S_{22}$, it is, thus, possible to calculate a tuning circuit 45 in known manner from the factor $S_{22}$, which is of such a nature that the reflection characteristics of the diode are so influenced that the reflection characteristic at the aerial 25, i.e. $\Gamma_i$ forms the corners in an equilateral triangle.

Below three examples are given where voltage levels $V_i$ are indicated in sequences being repeated.

At each example, further, said non-dimensional factor $S_{22}$ is indicated explicitly removed from said relation (1) above in order that a single side band is to be formed.

EXAMPLE I

| Voltage level (V) | Time interval (t) |
|---|---|
| $V_1$ | $0 < t < T/3$ |
| $V_2$ | $T/3 < t < 2T/3$ |
| $V_3$ | $2T/3 < t < T$ |

N = 3 yields from the above relation (1)

$$S_{22} = (\gamma_1 + \gamma_2 e^{j2\pi/3} + \gamma_3 e^{j4\pi/3}) / \left[ \gamma_1 \cdot \gamma_3 \left(1 + \frac{e^{j4\pi}}{3}\right) + \gamma_1 \cdot \gamma_2 \left(1 + \frac{e^{j2\pi}}{3}\right) + \gamma_2 \gamma_3 (e^{j2\pi/3} + e^{j4\pi/3}) \right] \quad (2)$$

EXAMPLE II

| Voltage level (V) | Time interval (t) |
|---|---|
| $V_1$ | $0 < t < T/4$ |
| $V_2$ | $T/4 < t < T/2$ |
| $V_3 = V_2$ | $T/2 < t < 3T/4$ |
| $V_4$ | $3T/4 < t < T$ |

N = 4 and the above relation (1) yield $$S_{22} = \frac{\gamma_1 + \gamma_2 (j - 1) - j\gamma_4}{(1 - j)\gamma_1\gamma_4 + j\gamma_1\gamma_2 - \gamma_4\gamma_2} \quad (3)$$

This relation (3) yields that $\Gamma_i$ in a reflection diagram in the plane of complex numbers must define a rectangular and isosceles triangle.

EXAMPLE III

| Voltage level (V) | Time interval (t) |
|---|---|
| $V_1$ | $0 < t < T/4$ |
| $V_2$ | $T/4 < t < T/2$ |
| $V_3$ | $T/2 < t < 3T/4$ |
| $V_4$ | $3T/4 < t < T$ |

N = 4 and the above relation (1) yield $$S_{22} = -\frac{b}{2a} \pm \sqrt{\frac{b^2 - 4ac}{4a^2}} \quad \text{where} \quad (4)$$

$a = (\gamma_1 - \gamma_3)\gamma_2\gamma_4 + j(\gamma_2 - \gamma_4)\gamma_1\gamma_3$
$b = (\gamma_1 - \gamma_3)(\gamma_2 + \gamma_4) + j(\gamma_2 - \gamma_4)(\gamma_1 + \gamma_3)$
$c = (\gamma_1 - \gamma_3) + j(\gamma_2 - \gamma_4)$ This relation (4) yields that $\Gamma_i$ in a reflection diagram in the plane of complex numbers shall define the end points on two straight lines, which intersect one another at a right angle and have equal length.

A carrier wave received at the aerial may be expressed as $A_o \cos(\omega_o t)$. After the reflection in the diode with associated tuning circuit both the amplitude and the phase position have been changed at every applied voltage level. The reflected wave may therefore be expressed as $A_i \cos(\omega_o t + \phi_i)$.

In FIGS. 5 and 6 the phase shifting of the carrier wave effected according to U.S. Ser. No. 667,306 is illustrated while the amplitude is maintained constant for generating a single side band. In FIG. 5 TE designates the envelope to the fully drawn staircase curve.

In FIGS. 7 and 8 the phase rotations and amplitude variations are illustrated by way of example which are the result of applying to the diode 44 three different voltage levels $V_1$, $V_2$ and $V_3$, i.e. according to the example I above.

It is evident, thus, that it is possible by only one dissipative diode and one tuning circuit to generate a single side band.

The present invention is described in the following with reference to the generation of two single side bands. When the pulse generator 28 generates only one frequency k, the desired side band $f_o - k$ is formed. The present invention, of course, comprises an embodiment where only one side band is formed by the above method and by utilizing only one diode.

A further advantage of the present invention is the possibility of obtaining an ideal modulator function even when the diode has relatively large losses, i.e. when the so-called dynamic Q-value is low.

According to a preferred embodiment, the diode is a varactor diode.

The Q-value is given for a given maximum interval in the voltage level, and one can choose between different intermediate voltages, depending on the desired degree of efficiency.

Example III yields the highest degree of efficiency, but on the other hand requires four different voltage levels.

Example II has the same sequence as Example III, but only three voltage levels are required. This embodiment, therefore, is preferred when a low number of voltage levels is essential. Example II yields a lower degree of efficiency than example III. Example I yields a higher degree of efficiency than example II when the Q-value ≳ 8.

As mentioned above, the pulse generator 28 generates two frequencies $k_1$ and, respectively, $k_2$. When a frequency modulator 26 according to the present invention is used, the pulse generator 28 is connected to the input 47 of the computer 40, which is arranged to calculate with the frequency $k_1$ and, respectively, $k_2$ when the computer 40 receives a signal from the pulse generator 28. The speed, at which the computer 40 calculates, is translated directly so that the commutator circuit 41 applies the different voltage levels on the diode 44 in a beat proportional to the frequency $k_1$ and, respectively, $k_2$. This results in in the formation of a side band $f_o + k_1$ and, respectively, $f_o + k_2$ at the output 46 of the tuning circuit 45. The starting and stopping of the pulse generator 28 is controlled by the code transmitter 27. The code transmitter 27 and the pulse generator 28 are arranged so, that the pulse generator 28 generates the frequency $k_1$ when the code transmitter emits one of the two binary digits 0 or 1, and generates the frequency $k_2$ when the code transmitter 27 emits the other binary digit. Hereby a single side band with the frequency $f_o + k_1$ will be transmitted during the duration of one binary digit, and with the frequency $f_o+k_2$ during the duration of the other binary digit. When the coding device does not send pulses to the pulse generator 28, the generator does not generate any signal.

As an example can be mentioned that the frequency $f_o$ can be 1-10 GHz, while $k_1$ and, respectively, $k_2$ are of the magnitude 10-100 kHz.

According to a further preferred embodiment, as mentioned already in the introductory portion of the descriptive part, a frequency divider 29 is provided which receives the frequency $k_1$ and, respectively, $k_2$ from the pulse generator 28 and divides this frequency to the frequency $k_1/n$ and, respectively, $k_2/n$, which are fed into the coding device 27. At this embodiment, the coding device emits the binary digits in the pulse train 27p with a length proportional to the cycle length of the frequencies $k_1/n$ and, respectively, $k_2/n$. When the pulse train 27p, for example, contains a binary "1", the pulse generator 28 emits, for example, the frequency $k_1$. This implies that the binary "1" is generated by n short pulses, which are repeated with the frequency $k_1$. A binary "0" is thus generated by n short pulses, which are repeated with the frequency $k_2$. According to this embodiment, each binary digit has a length, which is a multiple of the cycle length of the frequency $k_1$ and $k_2$ respectively. Each of the binary digits, thus, has a specific length, which is related to the cycle length of the signal $k_1/n$ and $k_2/n$, respectively, which frequencies are utilized in the receiver in the recording unit. In a conventional manner receiver 23 is capable of interpreting a binary digit from the time, during which one of the frequencies $f_o+k_1$ and $f_o+k_2$ is emitted by the recording unit.

The receiver of the recording unit is shown in greater detail in FIG. 10. It comprises a mixer 23 such that the frequency $k_1$ and, respectively, $k_2$ occurs on its output 60 and is emitted to a frequency discriminator 61, which can be of known type and has two outputs 62,63, at the first one 62 of which a signal with the frequency $k_1$ and, respectively, $k_2$ occurs, and at the second one 63 a data signal occurs. The frequency discriminator 61 is capable to emit as data signal a certain direct voltage when the frequency $k_1$ occurs at its input, and a different direct voltage when the frequency $k_2$ occurs at its input.

The signal at the first output 62 of the frequency discriminator is passed to a computer 64, which cyclically calculates n entire cycles and calculates the cycles n in number with a frequency of $k_1$ and, respectively, $k_2$. The computer 64 further is capable for every time when it has calculated n entire cycles to control a shift register 65 or other memory of known type to step one memory position ahead.

The signal at the second output 63 of the frequency discriminator is passed via an amplifier 66 to the shift register 65 where said data signal is stored. Between the amplifier 66 and the computer 64 a synchronizing coupling 67 is located, through which the amplifier sends a signal to the computer to start calculating when data enter into the amplifier. Data transferred from the recording transmitter are of binary kind, so that said data signal preferably consists of a pulsetrain of the two direct voltages, which thus alternate.

When, for example, a "0" is transferred from the recording transmitter, the frequency $k_1$, for example, occurs at the output of the receiver 23 and thereby at the first output 62 of the frequency discriminator 61. At the second output 63 of the frequency discriminator a direct voltage occurs, which after amplification is emitted to the shift register 65 and the computer 64 via the synchronizing coupling 67. The computer 64 starts counting n entire cycles of the frequency $k_1$ and thereafter controls the shift register 65 to step ahead one memory position. When, for example, five "0" are received without interruption therebetween, the direct voltage signal into the shift register is constant. The computer can count five cycles of n entire cycles, and in the shift register five "0" are stored in five respective positions. The course of events is entirely analogous when "1" are transferred, which gives then rise to the frequency $k_2$.

The said number n is equal to the division factor n of the frequency divider 29 stated above.

The synchronization of the computer 64 preferably takes place in such a manner, that the computer is set to zero and starts counting for every edge in the pulse train occurring at the second output 63 of the frequency discriminator 61.

It is, thus, clear that a certain information symbol is scanned by the duration of the received signal in dependence of its frequency.

The shift register thereafter is decoded by a coding device 68, which coded signal is transferred to the indication device 24.

The frequency discriminator 61 preferably is built up as shown in FIG. 11. It comprises a comparison circuit 70, a voltage-controlled oscillator 71 and an integrator 72. The output from the oscillator is coupled back to the comparison circuit 70. When the frequency $k_1$ and, respectively, $k_2$ lies within the operation range of the oscillator 71, the oscillator is adjusted to the received frequency so that the comparison circuit is capable of sending a signal corresponding to the difference frequency of the frequency of the received signal and the frequency of the oscillator when these do not agree. The frequency discriminator further is capable of supplying a signal to the integrator when the frequency of a received signal and the frequency of the oscillator agree, which signal is converted in the integrator to a data signal, which is a direct voltage.

The received frequencies $k_1$ and, respectively, $k_2$ are taken out at the oscillator 71. The generated direct voltages are taken out between the integrator 72, and the oscillator 71, where the integrator is an amplifying unit, which together with the oscillator 71 in a known manner forms a lower direct voltage level for the lower frequency, for example $k_1$, and a higher direct voltage level for the higher frequency, for example $k_2$.

In this way it is apparent that the reliability of information transfer is substantially improved for two reasons. First, two alternating frequencies differing from the interrogation frequency are retransmitted by the recording unit. Second, the receiver is capable of determining whether one or more equal binary digits were sent after each other.

The recording transmitter according to the present invention may be equipped with devices for remotely programming the transmitter according to the commonly owned U.S. application Ser. No. 828,031, filed Aug. 25, 1977. The recording transmitter then is capable of opening its memory for feeding information into the memory or out therefrom only when a key code, in the form of a pulse train at the beginning of the pulse train received from the recording unit, agrees with a code stored in a key device. The key code received is thus compared with the stored key code, and the memory of the recording transmitter is opened only when there is agreement therebetween.

FIG. 9 schematically illustrates a device for remotely programming the recording transmitter 26–29 of the aforesaid kind. According to FIG. 9, a key device 50, an electric memory 51 and, respectively, a control logic 52 for feeding in data into the memory and out therefrom correspond to the key device 72, the memory 75 and, respectively, the means 82 disclosed in said U.S. application Ser. No. 828,031.

The remote programming device 50–52 preferably is connected to the coding device 27. The device 50–52 preferably is designed so that a new key can be fed into the key device 50. The key device can comprise an electronic memory or make use of a portion of the memory 51. When the key device includes a memory, voltage must all the time be on necessary portions of the memory. The feed into the memory 51 and out therefrom takes place in the way described in said U.S. application Ser. No. 828,031. In the event that the key is to be changed, a message is sent, the first portion of which contains the key to be changed. Due to the key device 50 information then can be fed into the memory 51 and out therefrom by means of the control logic 52. After the key follows an instruction to the control logic 52 to erase the key to be changed, whereafter the new key follows together with an instruction to the control logic 52 to feed the new key into the key device 50. This embodiment is especially advantageous when a recording transmitter for any reason must be provided with a new identification code, as for example at re-destination of railway cars or, for example, at changes of traffic roads, etc.

The apparatus shown in FIG. 9 further can be provided with a capacitive aerial 53 for receiving a signal sent entirely adjacent to the recording transmitter by means of a sender aerial 54 completing a capacitive transfer link. To said sender aerial 54 an information transmitter 55 is connected which generates signals corresponding or similar to the signal emitted by the recording unit. The signals fed into the recording transmitter via the aerial 53 are processed in the manner described above when signals from the recording unit are received via the aerial 25. The advantage of this system is that the recording transmitter can be supplied with new information without requiring access to a recorder unit.

As mentioned above, voltage must all the time be applied to the entire memory 51 or portions thereof and possibly to the memory in the key device 50. According to a modified embodiment, the control logic 52 is capable upon the receipt of a signal of applying full voltage to all components in the recording transmitter, and when a signal is not received or sent, only to apply voltage to components requiring to permanently be live.

It is apparent, thus, that the present invention renders it possible that the frequency modulation of the signals takes place by devices, which are simpler and cheaper than conventional ones, and that the safety in the information transfer is increased substantially at the information transfer systems here concerned, and due to the possibility of changing the system by the introduction of new key codes the flexibility of the system is increased.

The present invention must not be regarded restricted to the embodiment described above, but can be varied within the scope of the attached claims.

We claim:

1. An apparatus for producing a single side band at systems where a signal of a certain frequency $f_o$ is received, frequency-shifted and retransmitted, characterized in that the apparatus comprises only one diode (44), in which the signal received with the frequency $f_o$ is intended to be reflected, and a commutator circuit (41) capable in repeated sequences to apply on the diode a series of different voltage levels generated in the commutator circuit, which voltage levels are at least three in number, and that a tuning circuit (45) is located between the diode (44) and an aerial (25) for transmitting and preferably also receiving the signal $f_o$, which tuning circuit (45) is capable to act upon the amplitude and phase variations occurring at the different voltage levels applied at the diode (44), so that the reflection coefficients $\gamma_i$ and the characteristics of the tuning circuit satisfy the condition for a single side band to occur, preferably the below condition, which applies to a single side band of the first order and a number N of voltage levels of equal duration $$i = \sum_{1}^{N} \frac{\gamma_i}{1 - S_{22}\gamma_i} \cdot e^{j\frac{2\pi}{N}i} = 0 \text{ where } \gamma_i = \frac{V_i}{V_{in}}$$

where $V_i$ is a voltage reflected by the diode, $V_{in}$ is a voltage incoming to the diode, and $S_{22}$ is a non-dimensional factor expressing the impedance of the tuning circuit (45) and the aerial (25) at the diode.

2. An apparatus as defined in claim 1, characterized in that the diode (44) is a varactor diode.

3. An apparatus as defined in claim 1 or 2, characterized in that a computer (40) is provided to emit signals comprising a frequency k to the commutator circuit (41), so that said circuit changes the voltage level at a speed corresponding to the frequency k, whereby a single side band $f_o+k$, alternatively $f_o-k$, occurs.

4. An apparatus for producing a single side band in systems where a signal of a certain frequency $f_o$ is received, frequency-shifted and retransmitted, characterized in that the apparatus comprises only one diode (44), in which the signal received with the frequency $f_o$ is intended to be reflected, and a commutator circuit (41) capable in repeated sequences of applying to the diode a series of four voltage levels generated in the commutator circuit, and that a tuning circuit (45) is located between the diode (44) and an aerial (25) for transmitting and preferably also receiving the signal $f_o$, which tuning circuit (45) is capable of acting upon the amplitude and phase variations occurring at the different voltage levels applied at the diode (44), so that the reflection coefficients $\gamma_i$ and the characteristics of the tuning circuit satisfy the condition for a single side band to occur, preferably the below condition, which applies to a single side band of the first order and a number N of voltage levels of equal duration $$\sum_{i=1}^{N} \frac{\gamma_i}{1 - S_{22}\gamma_i} \cdot e^{j\frac{2\pi}{N}i} = 0 \text{ where } \gamma_i = \frac{V_i}{V_{in}}$$

where N is equal to 4, $V_i$ is a voltage reflected by the diode, $V_{in}$ is a voltage incoming to the diode, and $S_{22}$ is a non-dimensional factor expressing the impedance of the tuning circuit (45) and the aerial (25) at the diode, the first and fourth ones of said four voltages levels being of different magnitudes, and the magnitudes of the second and third ones of said four voltage levels being equal to each other, but different from the magnitudes of the first and fourth ones of said four voltage levels.

5. An apparatus for producing a single side band in systems where a signal of a certain frequency $f_o$ is received, frequency-shifted and retransmitted, characterized in that the apparatus comprises only one diode (44), in which the signal received with the frequency $f_o$ is intended to be reflected, and a commutator circuit (41) capable in repeated sequences of applying to the diode four different voltage levels generated in the commutator circuit, and that a tuning circuit (45) is located between the diode (44) and an aerial (25) for transmitting and preferably also receiving the signal $f_o$, which tuning circuit (45) is capable of acting upon the amplitude and phase variations occurring at the different voltage levels applied at the diode (44), so that the reflection coefficients $\gamma_i$ and the characteristics of the tuning circuit satisfy the condition for a single side band to occur, preferably the below condition, which applies to a single side band of the first order and a number N of voltage levels of equal duration $$\sum_{i=1}^{N} \frac{\gamma_i}{1 - S_{22}\gamma_i} \cdot e^{j\frac{2\pi}{N}i} = 0 \text{ where } \gamma_i = \frac{V_i}{V_{in}}$$

where $V_i$ is a voltage reflected by the diode, $V_{in}$ is a voltage incoming to the diode, and $S_{22}$ is a non-dimensional factor expressing the impedance of the tuning circuit (45) and the aerial (25) at the diode.

6. An apparatus for producing a single side band in systems where a signal of a certain frequency $f_o$ is received, frequency-shifted and retransmitted, characterized in that the apparatus comprises only one diode (44), in which the signal received with the frequency $f_o$ is intended to be reflected, and a computer circuit (41) capable in repeated sequences of applying to the diode three voltage levels generated in the commutator circuit, and that a tuning circuit (45) is located between the diode (44) and an aerial (25) for transmitting and preferably also receiving the signal $f_o$, which tuning circuit (45) is capable of acting upon the amplitude and phase variations occuring at the different voltage levels applied at the diode (44), so that the reflection coefficients $\gamma_i$ and the characteristics of the tuning circuit satisfy the condition for a single side band to occur, preferably the below condition, which applies to a single side band of the first order and a number N of voltage levels of equal duration $$\sum_{i=1}^{N} \frac{\gamma_i}{1 - S_{22}\gamma_i} \cdot e^{j\frac{2\pi}{N}i} = 0 \text{ where } \gamma_i = \frac{V_i}{V_{in}}$$

where $V_i$ is a voltage reflected by diode, $V_{in}$ is a voltage incoming to the diode, and $S_{22}$ is a non-dimensional factor expressing the impedance of the tuning circuit (45) and the earial (25) at the diode.

7. A radio communication apparatus for receiving an electromagnetic signal of at least one frequency ($f_o$) and comprising a frequency translating modulator (26) having a single diode (44) connected to reflect the received electromagnetic signal, circuit means (41) connected to said modulator for supplying a modulating signal to said diode for biasing said diode, said modulating signal being in the form of a repetitive, stepped d.c. voltage having at least three different d.c. voltage levels which are successively applied to said diode to shift the phase of and thus shift the frequency of the signal reflected by said diode, a signal transmitting aerial (25), and a tuning circuit (45) connected intermediate said diode and said aerial for feeding the reflected signal to said aerial, said tuning circuit acting on the phase and amplitude of the reflected signal to eliminate unwanted frequencies from the reflected signal.

8. A radio communication apparatus for receiving an electromagnetic signal of at least one frequency ($f_o$) and comprising a frequency translating modulator (26) having a single diode (44) connected to reflect the received electromagnetic signal, circuit means (41) connected to said modulator for supplying a modulating signal to said diode for biasing said diode, said modulating signal being in the form of a repetitive, stepped d.c. voltage having at least three different d.c. voltage levels which are successively applied to said diode to shift the phase of and thus shift the frequency of the signal reflected by said diode, a signal transmitting aerial (25), and a tuning circuit (45) connected intermediate said diode and said aerial for feeding the reflected signal to said aerial, the combination of said tuning circuit and said aerial having a dimensionless impedance factor ($S_{22}$) which is a preselected function of the reflection coefficient of said diode at each of said d.c. voltage levels to provide for the elimination of unwanted frequencies from the reflected signal.

* * * * *